United States Patent
Smeljanskij

(10) Patent No.: US 10,634,209 B2
(45) Date of Patent: Apr. 28, 2020

(54) CONTROLLABLE SHOCK ABSORBER

(71) Applicants: THYSSENKRUPP BILSTEIN GMBH, Ennepetal (DE); thyssenkrupp AG, Essen (DE)

(72) Inventor: Dmitrij Smeljanskij, Leverkusen (DE)

(73) Assignees: THYSSENKRUPP BILSTEIN GMBH, Ennepetal (DE); THYSSENKRUPP AG, Essen (DE)

(*) Notice: Subject to any disclaimer, the term of this patent is extended or adjusted under 35 U.S.C. 154(b) by 0 days.

(21) Appl. No.: 15/572,543

(22) PCT Filed: Apr. 18, 2016

(86) PCT No.: PCT/EP2016/058497
§ 371 (c)(1),
(2) Date: Nov. 8, 2017

(87) PCT Pub. No.: WO2016/180602
PCT Pub. Date: Nov. 17, 2016

(65) Prior Publication Data
US 2018/0156299 A1 Jun. 7, 2018

(30) Foreign Application Priority Data
May 8, 2015 (DE) .......................... 10 2015 107 248

(51) Int. Cl.
F16F 9/46 (2006.01)
F16F 9/19 (2006.01)

(52) U.S. Cl.
CPC .............. F16F 9/465 (2013.01); F16F 9/19 (2013.01); *F16F 2228/066* (2013.01); *F16F 2230/18* (2013.01)

(58) Field of Classification Search
CPC .... F16F 9/464; F16F 9/19; F16F 9/465; F16F 9/5126; F16F 9/18; F16F 9/504;
(Continued)

(56) References Cited

U.S. PATENT DOCUMENTS 5,244,063 A * 9/1993 Laurien ................. B60G 17/08
188/266.8
5,318,157 A * 6/1994 Kempf ................... F16F 9/467
188/313
(Continued)

FOREIGN PATENT DOCUMENTS

CN 102472352 A 5/2012
DE 19650152 C 2/1998
(Continued)

OTHER PUBLICATIONS

English Translation of International Search Report issued in PCT/EP2016/058497, dated Jul. 21, 2016 (dated Jul. 28, 2016).
(Continued)

*Primary Examiner* — Bradley T King
*Assistant Examiner* — Mahbubur Rashid
(74) *Attorney, Agent, or Firm* — thyssenkrupp North America, Inc.

(57) ABSTRACT

A controllable shock absorber may include a cylinder tube with hydraulic fluid, a movable piston that divides the cylinder tube into two working spaces, and a piston rod connected to the piston. Two fluid leadthroughs in the piston may connect the two working spaces. Valve assemblies for damping piston movement in actuating directions may be arranged on the leadthroughs. Each valve assembly may have a pilot control chamber and a valve plate movable between open and closed positions. The valve plate can be prestressed into the closed position by pressure loading the pilot control chamber. Pressures in the pilot control chambers can be set by a pilot control valve having a valve body that is movable between open and closed positions. An outflow cross section between the pilot control chambers and the working spaces is settable. First and second outflow paths may adjoin the valve body on the outflow side, the first outflow path being closed when an actuator for actuating the
(Continued)

position of the valve body is inactive. A closing element separate from the valve body may be provided for closing the first outflow path.

20 Claims, 5 Drawing Sheets

(58) Field of Classification Search
CPC ...... F16F 15/005; F16F 15/03; F16F 2222/06; B60G 17/015; B60G 2401/17; B60G 2500/114; B60G 2600/26
See application file for complete search history.

(56) References Cited

U.S. PATENT DOCUMENTS

| | | | | |
|---|---|---|---|---|
| 5,409,088 A * | 4/1995 | Sonsterod | ............ | F16F 9/3214 137/542 |
| 5,449,055 A * | 9/1995 | Geiling | ............ | F16F 9/465 188/266.6 |
| 5,464,079 A * | 11/1995 | Lohberg | ............ | B60G 17/08 188/280 |
| 5,833,037 A * | 11/1998 | Preukschat | ............ | F16F 9/466 188/299.1 |
| 5,927,449 A * | 7/1999 | Huang | ............ | F16F 9/466 188/282.2 |
| 6,003,644 A * | 12/1999 | Tanaka | ............ | F16F 9/466 188/266.2 |
| 6,113,642 A * | 9/2000 | Petrofsky | ............ | A61F 2/68 188/282.3 |
| 6,119,831 A * | 9/2000 | Knecht | ............ | F16F 9/46 188/282.2 |
| 6,371,262 B1 * | 4/2002 | Katou | ............ | F16F 9/465 188/266.5 |
| 6,374,967 B2 * | 4/2002 | Matsumoto | ............ | F16F 9/46 188/266.5 |
| 6,422,360 B1 * | 7/2002 | Oliver | ............ | F16F 9/3482 188/266.3 |
| 6,491,145 B2 * | 12/2002 | Adamek | ............ | F16F 9/3484 188/282.2 |
| 6,668,986 B2 * | 12/2003 | Moradmand | ............ | F16F 9/466 188/266.2 |
| 6,782,980 B2 * | 8/2004 | Nakadate | ............ | F16F 9/3214 188/313 |
| 6,860,370 B2 * | 3/2005 | Nakadate | ............ | F16F 9/3485 188/282.5 |
| 7,654,369 B2 * | 2/2010 | Murray | ............ | F16F 9/466 188/266.5 |
| 7,694,785 B2 * | 4/2010 | Nakadate | ............ | F16F 9/3484 188/266.5 |
| 7,878,311 B2 * | 2/2011 | Van Weelden | ............ | F16F 9/465 137/487.5 |
| 7,946,399 B2 * | 5/2011 | Masamura | ............ | F16F 9/465 188/282.4 |
| 9,033,122 B2 * | 5/2015 | Ericksen | ............ | B62K 25/08 188/282.4 |
| 2001/0002639 A1 * | 6/2001 | Nezu | ............ | F16F 9/3485 188/319.1 |
| 2009/0020382 A1 * | 1/2009 | Van Weelden | ............ | F16F 9/465 188/282.2 |
| 2010/0252766 A1 * | 10/2010 | Forster | ............ | F16F 9/464 251/129.15 |
| 2012/0145496 A1 * | 6/2012 | Goetz | ............ | F16F 9/464 188/282.1 |
| 2014/0353099 A1 | 12/2014 | Yamashita | | |
| 2015/0316118 A1 | 11/2015 | Smeljanskij | | |
| 2016/0195152 A1 * | 7/2016 | Mori | ............ | F16F 9/465 188/313 |
| 2016/0312851 A1 | 10/2016 | Hamers | | |
| 2017/0234396 A1 | 8/2017 | Hamers | | |

FOREIGN PATENT DOCUMENTS

| | | | |
|---|---|---|---|
| DE | 102011000566 B | 5/2012 | |
| DE | 102012109437 A | 4/2014 | |
| DE | 102013114169 A | 6/2015 | |
| GB | 2250799 A | 6/1992 | |
| KR | 100451289 B | 10/2004 | |
| WO | 2010122102 A | 10/2010 | |
| WO | 2016066314 A | 5/2016 | |
| WO | WO-2016131908 A1 * | 8/2016 | ............. F16F 9/465 |

OTHER PUBLICATIONS

English Abstract of DE102011000566B.
German application No. DE 102014115577.7 as mentioned in the specification (not yet published).

* cited by examiner

CONTROLLABLE SHOCK ABSORBER

CROSS REFERENCE TO RELATED APPLICATIONS

This application is a U.S. National Stage Entry of International Patent Application Serial Number PCT/EP2016/058497, filed Apr. 18, 2016, which claims priority to German Patent Application No. DE 10 2015 107 248.3 filed May 8, 2015, the entire contents of both of which are incorporated herein by reference.

FIELD

The present disclosure generally relates to shock absorbers, including controllable shock absorbers for motor vehicles.

BACKGROUND

German patent application 10 2014 115 577.7 which has not yet been published discloses a controllable shock absorber for a motor vehicle chassis. A pilot control pressure for loading the valve plates by means of a magnet actuator can be set in a targeted manner via a valve assembly. Here, the pilot control pressure is set both in the compression stage and in the rebound stage with the aid of a valve body. During regular operation, the fluid which flows out via the pilot control valve is guided via a first outflow path, in which an outflow valve with comparatively soft characteristics is provided. For the case where the magnet actuator fails and therefore the actuation of the pilot control valve fails, the fluid is conducted through a second outflow path, in which a failsafe valve with a comparatively hard characteristic is arranged, and by way of which failsafe valve emergency running properties are set. The switchover of the outflow path takes place by way of the valve body itself; if the magnet actuator fails, the valve body is automatically moved into a position, in which it shuts an inlet opening of the first outflow path.

It is fundamentally preferred in shock absorbers of this type if the damping characteristic of the shock absorber can be set in the individual stages (compression stage, movement of the piston in the direction of the working space which is remote from the piston rod, and rebound stage, movement of the piston in the direction of the piston rod-side working space) as far as possible independently of the respective other stage.

One particular possibility of an individual setting capability of this type is disclosed in DE 10 2011 000 566 B3. A shock absorber with a controllable pilot control means is described here, in which shock absorber the active faces on the pilot control valve are configured differently for the two stages. Different loading of the valve body during the individual stages is thus generated. This has not been able to be applied up to now, however, to valve bodies of the type, by way of which the switchover between two outflow parts is also to be realized. This is because the valve body is loaded directly by the working pressure in the working space which is remote from the piston rod in the compression stage. Above a certain piston speed, the valve body is opened completely and is transferred into its upper stop position. If, however, the valve body is then at the same time also to take on the switchover to the failsafe function, the regular (first) outflow path is at the same time also shut by way of the stop position, and the (second) outflow path is activated via the failsafe valve.

Thus a need exists for an improved controllable shock absorber and in the process, in particular, an improved and universally applicable possibility for the individual setting capability of the damping characteristic for the individual stages.

DETAILED DESCRIPTION

Figure 1:
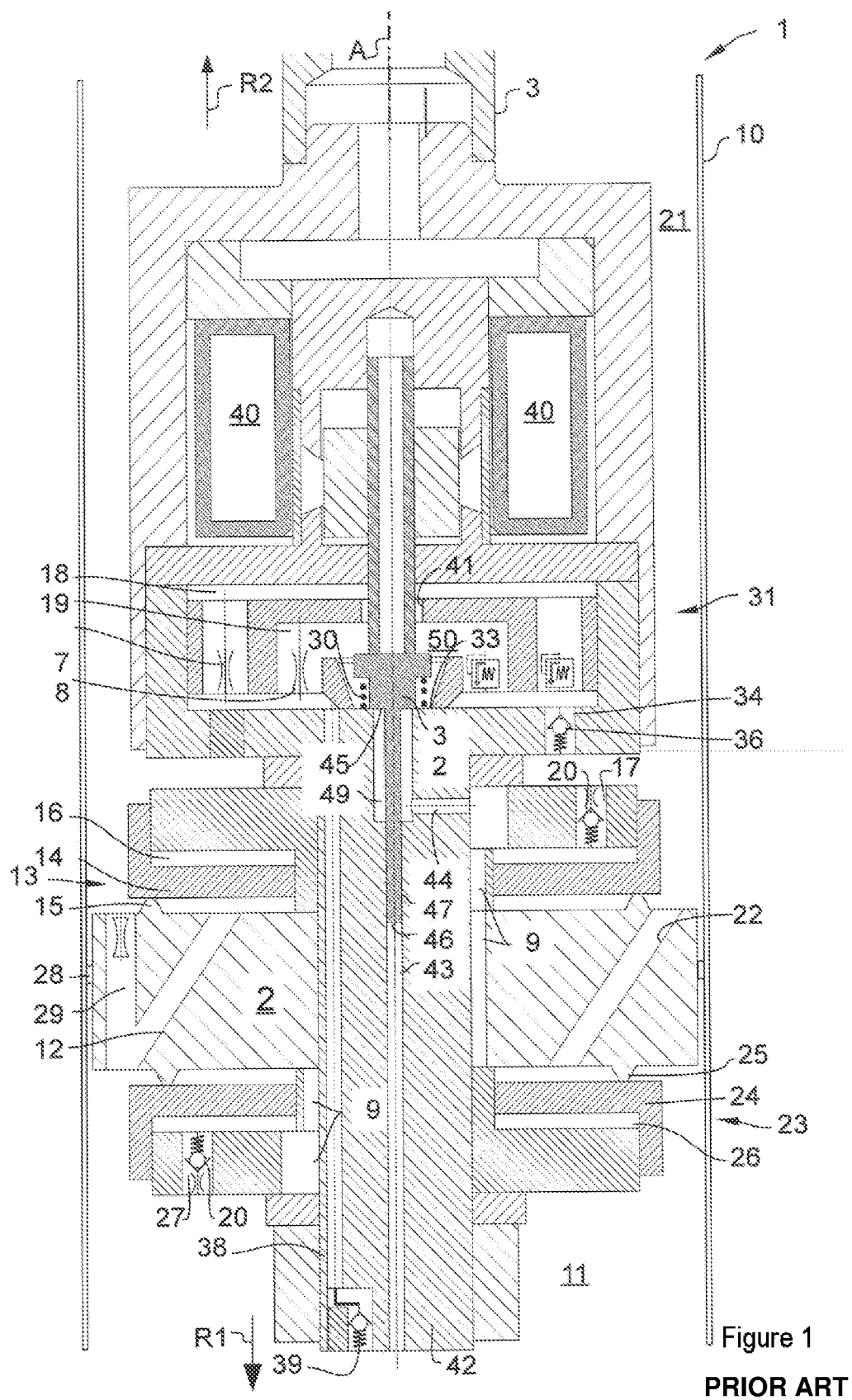
FIG. 1 is a cross-sectional view of a comparative example of a shock absorber.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Thus, according to the invention, a controllable shock absorber is proposed, in particular for a motor vehicle chassis. A shock absorber of this type comprises a cylinder tube which has a hydraulic fluid which is received therein in a sealed manner, a piston which can be moved axially along a cylinder tube axis within the cylinder tube and which divides the cylinder tube into two working spaces, and a piston rod which is oriented parallel to the cylinder tube axis and is connected to the piston at one end. At least two fluid leadthroughs are provided in the piston, by way of which fluid leadthroughs the one working space is connected to the other working space, a first valve assembly for damping the piston movement in a first actuating direction being arranged on a first fluid leadthrough, and a second valve assembly for damping the piston movement in a second actuating direction being arranged on a second fluid leadthrough, each valve assembly having at least one valve plate which is seated on a valve seat in a closed valve position and is spaced apart at least partially from the valve seat in an open valve position. Each valve assembly comprises a pilot control chamber, it being possible for the respective valve plate to be prestressed into the closed valve position by way of pressure loading of the pilot control chamber, it being possible for the pressure in the respective pilot control chambers to be set by way of at least one, in particular precisely one, pilot control valve, the pilot control valve comprising a valve body which can be moved in a defined manner between a closed position and an open position, as a result of which an outflow cross section between the pilot control chambers and the working spaces can be set in a targeted manner.

The valve body is adjoined on the outflow side by a first outflow path and a second outflow path, the first outflow path being closed if an actuator for actuating the position of the valve body is inactive. The first outflow path is then closed by the valve body in a failsafe state (for example, failure of the power supply of the actuator). The fluid is then largely forced to flow out through the second outflow path. A failsafe valve can then be arranged in said second outflow path, by way of which failsafe valve a pilot control pressure can be built up in a targeted manner for the case where the pilot control valve is out of service.

The shock absorber according to the invention is distinguished by the fact that a closing element which is configured separately with respect to the valve body is provided for closing the first outflow path.

First of all, a functional separation between the setting of the pilot control pressure firstly and the switchover between the two outflow paths secondly is realized by way of said arrangement. It becomes possible here for the first time at all for certain applications to select and to actuate different outflow paths independently of the position of the pilot control valve for the outflow of fluid from the pilot control valve.

The invention can be used, in particular, in a shock absorber of this type, the valve bodies of which are assigned at least two active faces. If said active faces are pressurized by fluid during the operation, said active faces in turn load the valve body into its open valve position. The active faces can be attached on the valve body itself, but they can also be arranged on separate components which correspondingly interact with the valve body. The sum of the active faces which are loaded with pressure during the piston movement in one of the two actuating directions, in particular the second actuating direction, is smaller than the sum of the active faces which are loaded with pressure during the piston movement in the other of the two actuating directions, in particular the first actuating direction.

In other words, the pilot control pressure acts only on an active face which is smaller in total during the one stage, and the pilot control pressure acts on a face which is greater in total during the other stage. This has a direct effect on the forces, by way of which the valve body is loaded into its open position.

In particular, the invention can be used if the valve body is loaded directly by way of the operating pressure in the respective pressurized working space, in particular the working space which is remote from the piston rod, in one of the two stages, in particular the compression stage.

By way of the increased loading of the valve body in one of the stages, the valve body can pass easily into its open stop position which shuts the first outflow path, without there being the necessity to close said first outflow path on account of a malfunction. As a result of the above-described functional separation, the first outflow path can remain open even when the valve body is at the stop point in its open position, since assuming said position no longer automatically brings about the switchover between the two outflow paths.

Furthermore, the invention can be used, in particular, in shock absorbers of the type which comprises exactly one valve body for setting the pilot control pressure in the two pilot control chambers, and the position of which is set in a targeted manner during the operation with the aid of an actuator.

The closing element can be moved in a targeted manner, in particular, between a closed position, in which it closes an inlet opening of the first outflow path, and an open position, in which it releases the inlet opening. Here, the term "close" is not to be interpreted too narrowly; an absolute seal of the closure which is produced is not required.

In the case of the inactive actuator, the magnetic closing element can preferably be loaded into its closed position by way of the pressure which prevails in the second outflow path. This can be achieved, in particular, by way of suitable bores or the like, through which the pressure is conducted from the second outflow path to the rear side of the magnetic closing element. Any pressure peaks in the region of the pilot control valve thus tend to have a closing effect rather than an opening effect on the closing element.

The closing element is preferably magnetically actuable. The closing element itself can be magnetic or can be connected fixedly to a magnetic body. The closing element can be disk-shaped.

The closing element is preferably arranged in the magnetic flux immediately adjacently with respect to a magnetic element, in particular an armature, which loads the valve body into its closed position as soon as the magnetic element itself is loaded magnetically. A separate magnetic pole tube section can be dispensed with here, which can result in a reduction in components. The closing element can have a sleeve continuation which extends in the direction of said magnetic element, with the result that the magnetic flux can enter into the closing element.

A common restoring element, in particular restoring spring, is preferably provided for restoring the valve element and the closing element. Said common restoring element can be arranged between the abovementioned magnetic element and the closing element. In particular, it serves to load the valve body into its open position and to load the closing element into its closed position, in which it closes the first outflow path. This can also result in a reduction in components, since separate restoring elements for the valve element and the closing element can be dispensed with.

An actuator for loading the closing element into the open position is preferably provided. Said actuator is the same actuator, by means of which the position of the valve body is actuated. If said actuator is capable of actuating the position of the valve body, it is active. The magnetic flux which is generated by way of said actuator can then at the same time be used to hold the closing element in its open position. If said actuator is no longer capable of actuating the position of the valve body, it is inactive and does not generate any magnetic flux; the closing element is then loaded into the closed position by way of suitable restoring means or the fluid.

The invention can be used, in particular, in the shock absorbers of this type, the valve body being assigned, in particular in the first outflow path or in a manner which is positioned downstream of the first outflow path, an outflow valve on the outflow side, by way of which outflow valve a back pressure which acts on the valve body can be built up on the outflow side.

The shock absorber 1 comprises a cylinder tube 10, in which a piston 2 is held such that it can be displaced along a cylinder tube axis A. The piston 2 has an annular seal or a piston band 28 on its outer circumference, with the result that the piston 2 divides the cylinder tube 10 in a sealing manner into a first working space 11 (remote from the piston rod) and into a second (piston rod-side) working space 21. The piston 2 is fastened to a fastening pin 42 which is in turn connected fixedly to a piston rod 3. Upon actuation of the piston rod 3 in a first actuating direction R1 toward the first working space 11 (also called the "compression direction"), the pressure in the first working space 11 increases. Fluid which is present in the first working space 11 then flows through a first fluid leadthrough 12 in the piston 2 into the second working space 21. Here, the fluid flows through the first fluid leadthrough 12 and through a first valve assembly 13 with a pressure limiting valve 14. The pressure limiting valve 14 can be formed, for example, from one or more flexible valve plates 14. When a minimum pressure of the fluid in the first working space 11 is reached, the first pressure limiting valve 14 which is seated with prestress on a first valve seat 15 is released at least partially from the first valve seat 15. The valve plate 14 is thus transferred from the closed position into the open position, in which it is lifted up from the valve seat. A hydraulic connection is thus established between the first working space 11 and the second working space 21. Here, the first pressure limiting valve 14 in interaction with the first valve seat 15 generates the damping force.

The pressure limiting valve 14 is loaded in the direction of the valve seat 15 by way of a pressure ("pilot control pressure" in the following text) which prevails in a first pilot control chamber 16. Said pilot control pressure in the first pilot control chamber 16 can be set in a defined manner during the operation. It can be seen that the opening pressure of the pressure limiting valve 14 is higher, the higher the pilot control pressure in the first pilot control chamber 16. The pilot control pressure therefore influences the characteristic profile of the damping force in the p-v diagram. A bypass duct 29 is provided, in order to realize a bypass volumetric flow which bypasses the valve plates 14.

Furthermore, the shock absorber 1 comprises a second valve assembly 23 which is of analogous configuration with respect to the first valve assembly 13. The second valve assembly 23 is provided for braking the flow of the fluid when the piston 2 is moved in a second actuating direction R2 (also called "rebound direction"). In this case, the fluid flows from the second working space 21 via a second fluid leadthrough 22 into the first working space 11. The second valve plate 24 is loaded in the direction of the valve seat 25 by way of a pilot control pressure which prevails in a second pilot control chamber 26. The second valve plate 24 and a second valve seat 25 are of analogous configuration with respect to the corresponding components of the first valve assembly 13.

The two pilot control chambers 16, 26 are connected to one another hydraulically via a connecting leadthrough 9. The connecting leadthrough 9 is connected via a radial bore 44 to an annular chamber 49. The annular chamber 49 opens into a pilot control valve chamber 50 of a pilot control valve 31 which will be described in greater detail further below. The same pressure always substantially prevails in the two pilot control chambers 16, 26 as a result of the hydraulic connection by means of the connecting leadthrough 9. If the piston 2 is then moved in the first actuating direction R1, the pressure in the first working space 11 increases and the damping fluid flows through a fluid leadthrough 27 between the first working space 11 and the second pilot control chamber 26 out of the first working space 11 into the second pilot control chamber 26, as a result of which the pilot control pressure in the second pilot control chamber 26 is increased. The pilot control pressure which is built up in the second pilot control chamber 26 also propagates through the connecting leadthrough 9 into the first pilot control chamber 16. As a result, the pilot control pressure is generated in the first pilot control chamber 16, by way of which pilot control pressure the damping behavior of the first valve assembly 13 is influenced. The same applies to the actuation in the second actuating direction R2. In this case, the fluid flows from the second working space 21 through a fluid leadthrough 17 between the second working space 21 and the first pilot control chamber 16 into the first pilot control chamber 16. The pilot control pressure which is thus generated in the first pilot control chamber 16 in turn propagates through the connecting leadthrough 9 into the second pilot control chamber 26. In order that the fluid cannot flow through the fluid leadthroughs 17, 27 from the first pilot control chamber 16 directly into the second working space 21 or from the second pilot control chamber 26 into the first working space 11, in each case one one-way valve 20 is attached in the fluid leadthroughs 17, 27, which one-way valves 20 are configured, for example, as check valves.

The pilot control pressure in the two pilot control chambers 16 and 26 can be regulated. To this end, the above-addressed pilot control valve 31 is provided which has a valve body 32. The valve body 32 is held such that it can be moved along the cylinder tube axis A, and can be seated on a stationary (in relation to the fastening pin) valve seat 33. When the valve body 32 is seated on the valve seat 33, an outflow of fluid which flows out of the pilot control chambers 16, 26 through the annular chamber 49 into the pilot control valve chamber 50 is largely prevented by way of the pilot control valve 31. When the valve body 32 is released from the valve seat 33, fluid can flow out of the connecting leadthrough 9 and the annular chamber 49 by way of the pilot control valve 31. The pilot control pressure can be set with the aid of the position of the valve body 32. Here, the valve body 32 is loaded by means of a magnetic actuator 40 toward the valve seat 33, that is to say in the first actuating direction R1. A spring 30 is provided for restoring purposes, and loads the valve body 32 away from the valve seat 33, that is to say in the direction of the second actuating direction R2. Furthermore, the valve body 32 is loaded away from the valve seat 33 by way of the pilot control pressure. Depending on the balance of forces, due to the magnetic actuator 40, the spring 30 and the pilot control pressure, the result is then the position of the valve body 32 with respect to the valve seat 33.

The fluid which flows out through the pilot control valve 31 flows through a second outflow passage 34 to the second working space 21 upon actuation of the piston rod in the direction R1 (compression stage, increased pressure in first working space 11). A one-way valve 36 is arranged in the second outflow passage 34. In this case, the one-way valve 36 prevents fluid from the second working space 21 from being able to pass through the pilot control valve 31 in the direction of the pilot control chambers 16, 26.

Upon actuation of the piston rod 3 in the direction R2 (rebound stage, increased pressure in second working space 21), the fluid which flows out through the pilot control valve 31 flows through a first outflow passage 38 to the first working space 11. The first outflow passage 38 is formed by way of an axial bore in the fastening pin 42. A one-way valve 39 in the outflow passage 38 prevents fluid from the second working space 21 from passing through the pilot control valve 31 in the direction of the pilot control chambers 16, 26. In addition, the two one-way valves 36, 39 prevent a direct connection of the two working spaces 11, 21 via the outflow passages 34, 38.

Two possible outflow paths 18, 19 are provided for the outflow of the fluid which flows past between the valve body 32 and the valve seat 33.

A first outflow path 18 is provided for the regular operation. An outflow valve 7 can be provided at the end of said first outflow path 18, by way of which outflow valve 7 the balance of pressure in the first outflow path 18 can be set. In addition to or instead of the throttle which is shown in the left-hand image half, an outflow valve 7 of this type can also have a pressure limiting valve (which is possibly connected in parallel), which pressure limiting valve is shown by way of example in the right-hand image half (without designation).

In the case of a defect of the magnet actuator 40, the loading of the valve body 32 by way of said magnet actuator 40 is canceled. The valve body 32 is therefore loaded only by way of the spring 30 and the pilot control pressure, and is thus moved upward. The valve body 32 then shuts an inlet opening 41 of the first outflow path 18. The fluid then flows out through a second outflow path 19, in which a failsafe valve 8 is arranged. In addition to or instead of the throttle which is shown in the left-hand image half, a failsafe valve 8 of this type can also have a pressure limiting valve (which is possibly connected in parallel), which pressure limiting valve is shown by way of example in the right-hand image half (without designation). Emergency running properties of the shock absorber can be set with the aid of said failsafe valve 8.

In embodiments known up to now (for example, German patent application 10 2014 115 577.7 which has not yet been published), the valve body 32 has a common active face both for the rebound stage and for the compression stage. In the case of the present shock absorber, in contrast, active faces which differ at least in regions are provided on the common valve body 32 for the rebound stage and the compression stage.

The active faces which are loaded for the rebound stage and compression stage are therefore in each case of different magnitude. In the present case, a total of two active faces 45, 46 are provided; a first active face 45 is arranged on the valve body 32 itself and is loaded by way of the pilot control pressure both in the compression stage and in the rebound stage. A second active face 46 is arranged on a plunger 47 which is configured in one piece with the valve body 32. The second active face 46 is arranged in such a way that the pressure from the first working space 11 acts directly on the second active face 46 only during the compression stage. This results in the face difference of the active faces loaded during the respective stages. Accordingly, the balance of forces on the valve body 32 changes, even when identical closing forces are set by way of the actuator 40 for the rebound stage and compression stage.

The plunger 47 is arranged in a bore 43 which has an access into the first working space 11. The second active face 46 of the plunger 47 is thus loaded by way of the operating pressure which prevails in the first working space 11 merely in the compression stage. The radial bore 44 opens directly into the annular chamber 49. The plunger 47 is guided through the annular chamber 49.

The position of the degression point in the associated p-v diagram can be positioned independently for both stages by way of the additional loading of the valve body in the compression stage by way of the pressure which prevails in the first working space. A harder characteristic for the rebound stage and a softer characteristic for the compression stage can thus be set. Reference is made for details to the description in respect of FIGS. 3a and 3b of DE 10 2011 000 566 B3.

The refinement according to FIG. 1 cannot be realized satisfactorily by way of means of this type, however. This is because the operating pressure which prevails in the first working space 11 loads the second active face in the compression stage to such a pronounced extent that the valve body 32 can be moved into its upper stop position and in the process shuts the inlet opening 41. The fluid could then flow out only through the second outflow path 19, as a result of which the failsafe characteristic is set. This is undesirable, however.

Figure 2:
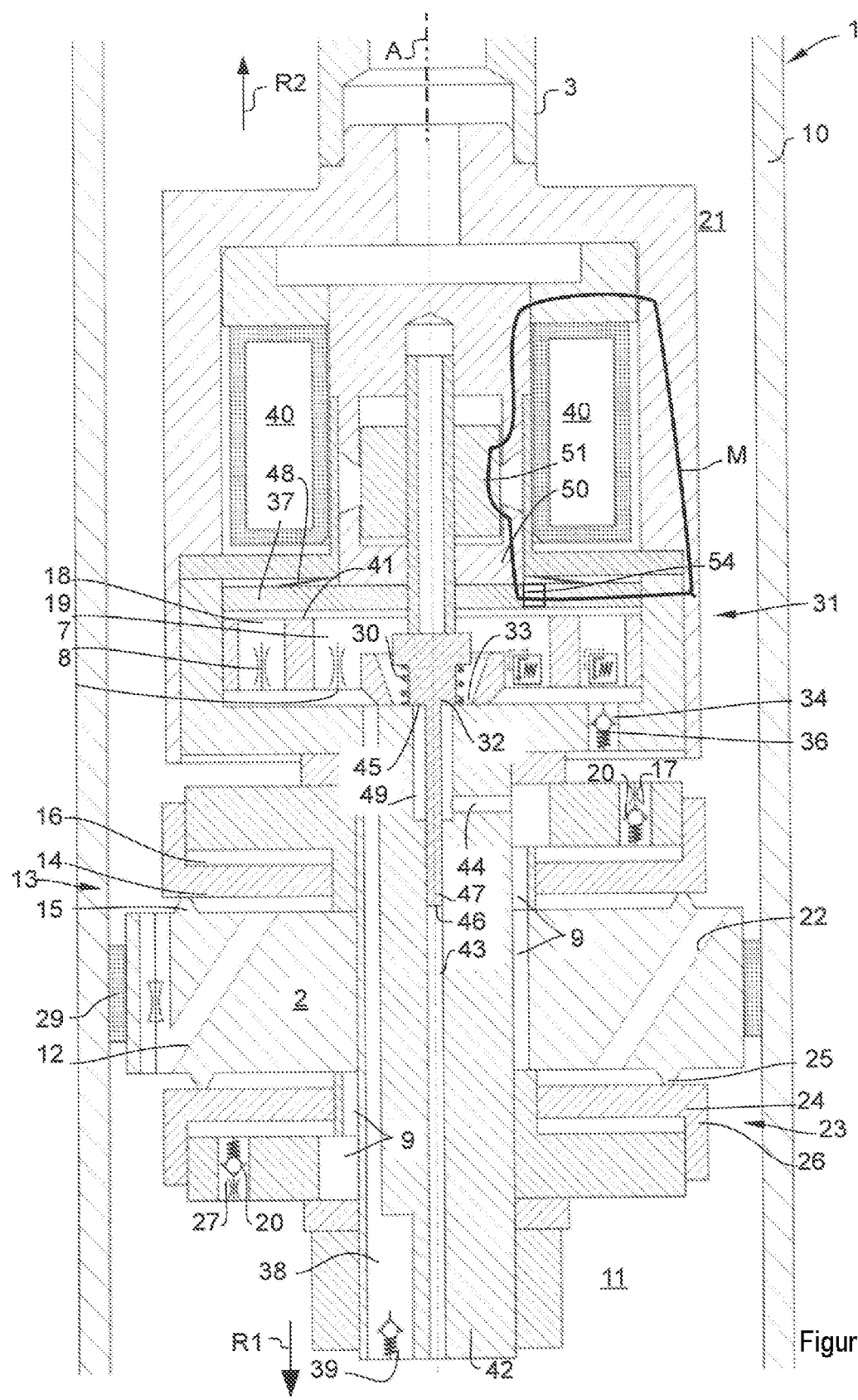
FIG. 2 is a cross-sectional view of an example first shock absorber in a first operating state.
Figure 3:
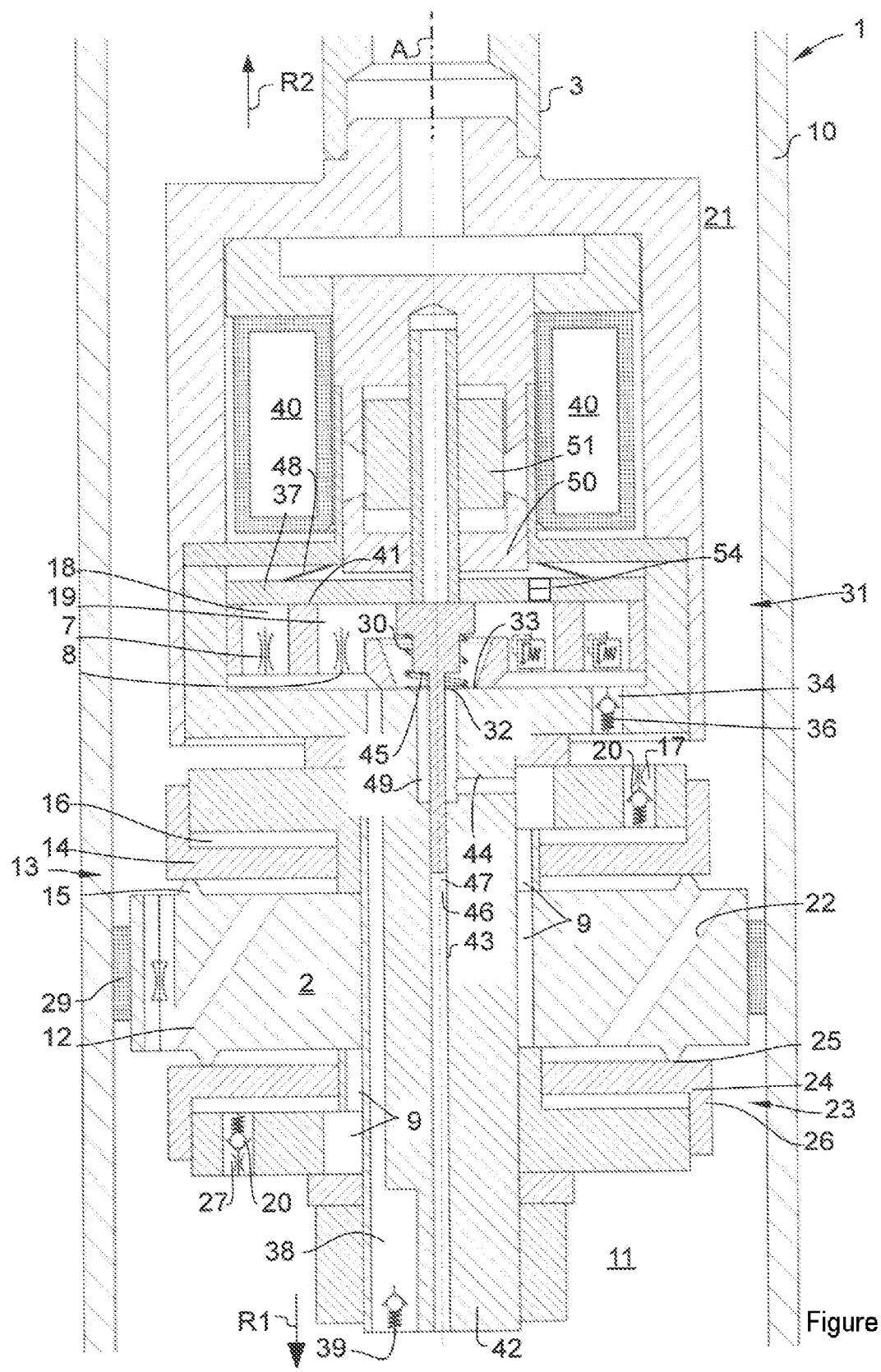
FIG. 3 is a cross-sectional view of the first shock absorber according to FIG. 2 in a second operating state.

In FIGS. 2 and 3, a development according to the invention of the shock absorber according to FIG. 1 will now be described. The shock absorber according to FIGS. 2 and 3 corresponds largely to the shock absorber of FIG. 1; reference is made to this extent to the preceding description of FIG. 1. Merely the differences will be described in the following text.

Although the valve body 32 according to FIG. 2 is of virtually identical configuration to the valve body 32 according to FIG. 1, the valve body 32 in FIG. 2 is no longer provided to seal the inlet opening 41 of the first outflow path 18 if necessary. A closing element 37 is now additionally provided for the "switchover" between the two outflow paths 18, 19. Said closing element 37 is a magnetic disk 37 in the present case and is actuated by way of the actuator 40.

FIG. 2 shows the magnetic disk 37 in an open position, since the magnet 40 is active and generates a magnetic flux M; fluid can now flow out through the inlet opening 41 and the first outflow path 18. Here, the magnetic flux M flows from an armature 51 which loads the valve body 32 into its closed position, via a magnetic pole tube section 50 into the magnetic disk 37.

FIG. 3 shows the magnetic disk 37 in a closed position when the magnetic flux is canceled in the case of an actuator defect. The magnetic disk 37 now covers the inlet opening 41. The fluid flows out through the second outflow path 19.

The magnetic force of the actuator 40 is sufficient for the transfer of the magnetic disk 37 into the open position and holding the magnetic disk 37 in the open position, when said actuator 40 is active and sets the position of the valve body 32. If said force of the actuator is canceled, for example in the case of a faulty state, the magnetic disk 37 is loaded into the closed position by way of a restoring spring 48. The magnetic disk 37 has a bore 54 radially on the inside, through which bore 54 a pressure equalization can largely be generated between the second outflow path 19 and the rear side of the disk 37. This causes the disk 37 to be loaded into its closed position by way of the pressure difference between the two outflow paths 18, 19.

It is necessary in said refinement that the actuator 40 is loaded with a certain minimum load (for example, current loading of at least 0.4 A), in order to hold the closing element (the magnetic disk 37 here) in its open position. In the case of said minimum load, however, the valve body 32 would be loaded constantly into its closed position. The shock absorber could thus no longer be operated with the soft characteristic. The spring 30 now provides a counterforce for the minimum load of the actuator 40, with the result that the valve body 32 (with the exception of loading by way of fluid from the duct 9) is in force equilibrium even during the minimum load, and a soft characteristic of the shock absorber can therefore be set.

Figure 4:
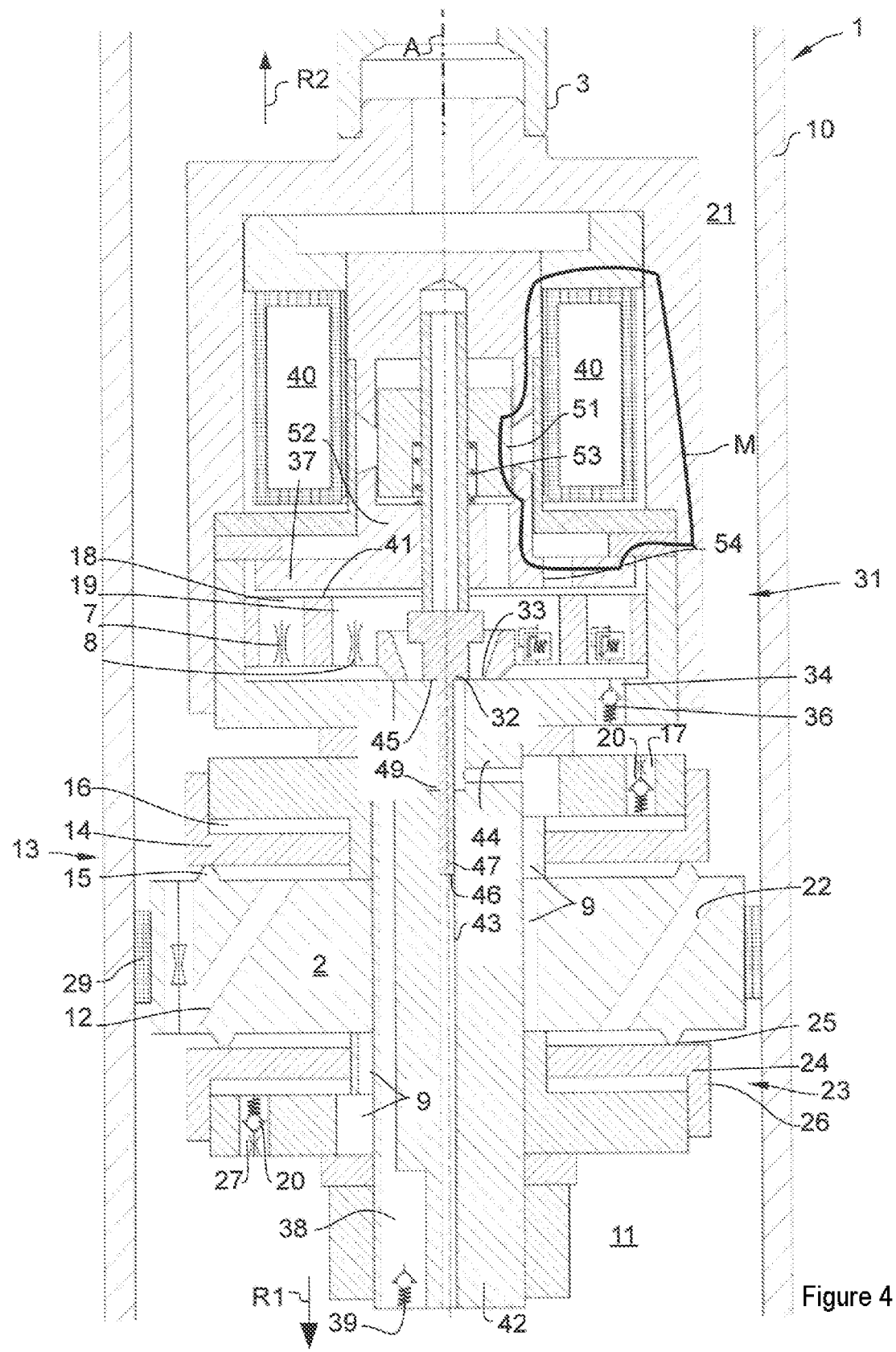
FIG. 4 is a cross-sectional view of an example second shock absorber in a first operating state.
Figure 5:
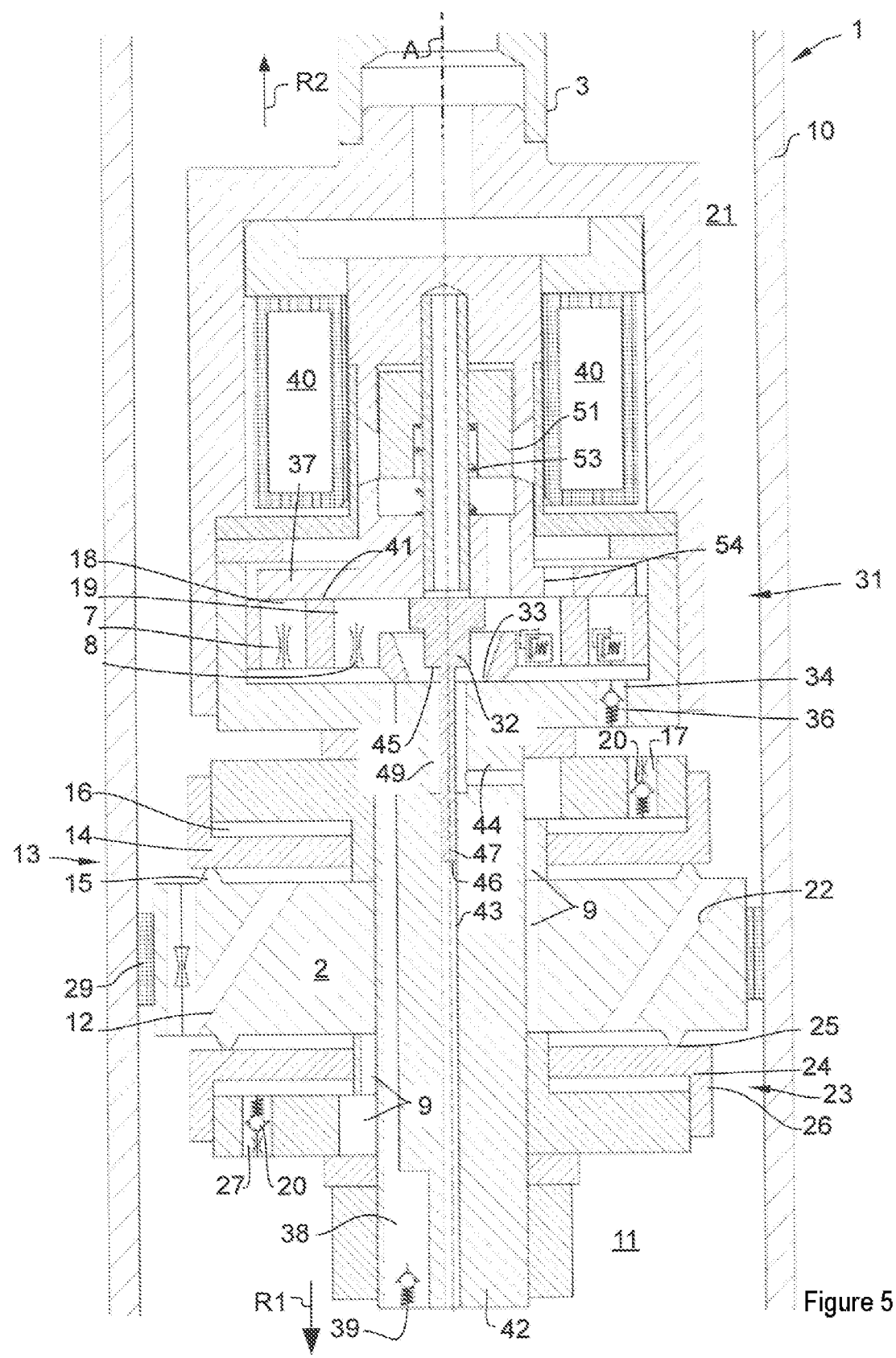
FIG. 5 is a cross-sectional view of the second shock absorber according to FIG. 4 in a second operating state.

FIGS. 4 and 5 show a further shock absorber which corresponds largely to the shock absorber according to FIGS. 2 and 3; to this extent, merely the differences will be described in the following text.

The magnetic pole tube section 50 from the above-described refinement (FIGS. 2 and 3) is absent in this refinement. The magnetic flux M now passes from the armature 51 directly onto the magnetic disk 37, since the latter is arranged immediately adjacently with respect to the armature 51, it being possible for a small air gap to be arranged in between. To this end, the magnetic disk 37 has a sleeve continuation 52 which is arranged at least partially radially within the armature 51. Furthermore, two separate restoring springs 30, 48 (FIGS. 2 and 3) can be dispensed with. This is because a common restoring spring 53 is now sufficient for restoring both the valve body 32 and the magnetic disk 37; said common restoring spring 53 is clamped in between the armature 51 and the magnetic disk 37. As a consequence, the result is savings in the number of components in comparison with the abovementioned refinement.

The magnetic flux is dispensed with in FIG. 5. The spring 53 loads the magnetic disk 37 into its closed position.

LIST OF DESIGNATIONS

1 Shock absorber
2 Piston
3 Piston rod
6 Dimensionally stable movable cover
7 Outflow valve
8 Failsafe valve
9 Connecting leadthrough between the two pilot control chambers
10 Cylinder tube
11 First working space (remote from the piston rod)
12 First fluid leadthrough
13 First valve assembly
14 First valve plate
15 First valve seat
16 First pilot control chamber
17 Fluid leadthrough between the second working space 21 and the first pilot control chamber 16
18 First outflow path
19 Second outflow path
20 One-way valve
21 Second (piston rod-side) working space
22 Second fluid leadthrough
23 Second valve assembly
24 Second valve plate
25 Second valve seat
26 Second pilot control chamber
27 Fluid leadthrough between the first working space 11 and the second pilot control chamber 26
28 Annular seal
29 Bypass duct
30 Restoring spring
31 Pilot control valve
32 Valve body
33 Valve seat
34 Second outflow passage to the second working space
35 Pin/turquoise for the reallocation of designations
36 One-way valve
37 Magnetic disk
38 First outflow passage to the first working space
39 One-way valve
40 Magnetic actuator
41 Inlet opening of the first outflow path
42 Fastening pin
43 Axial connecting bore between the first working space and the annular chamber
44 Radial bore
45 First active face
46 Second active face
47 Plunger
48 Restoring spring
49 Annular chamber
50 Magnetic pole tube section
51 Armature
52 Sleeve continuation
53 Common restoring spring
54 Bore
R1 Compression direction
R2 Rebound direction
A Cylinder tube axis
R Actuating direction
p Back pressure
M Magnetic flux

What is claimed is:

1. A controllable shock absorber comprising:
a cylinder tube that contains hydraulic fluid in a sealed manner, the cylinder tube extending along a cylinder tube axis;
a piston that is movable axially within the cylinder tube along the cylinder tube axis, the piston dividing the cylinder tube into two working spaces, wherein the piston comprises a first fluid leadthrough and a second fluid leadthrough that connect the two working spaces;
a piston rod that is connected to the piston and is parallel to the cylinder tube axis;
a first valve assembly disposed on the first fluid leadthrough for damping movement of the piston in a first actuating direction;
a second valve assembly disposed on the second fluid leadthrough for damping movement of the piston in a second actuating direction, wherein each of the first and second valve assemblies comprises
a valve plate that is seated on a valve seat in a closed valve position and spaced apart at least partially from the valve seat in an open valve position, and
a pilot control chamber, wherein the valve plate is configured to be prestressed into the closed valve position by pressure loading the pilot control chamber,
wherein pressures in the pilot control chambers are settable by way of a pilot control valve that comprises a valve body that is movable between a closed position and an open position, wherein moving the valve body between the closed and open positions adjusts an outflow through which hydraulic fluid flows from the pilot control chambers to the two working spaces;
a first outflow path and a second outflow path adjoining the valve body on an outflow side, wherein the first outflow path is closed when an actuator for actuating a position of the valve body is inactive; and
a closing element that is separate from the valve body and is configured to close the first outflow path.

2. The controllable shock absorber of claim 1 wherein the valve body is assigned at least two active faces that load the valve body into the open position upon pressure loading, wherein a sum of the at least two active faces that are loaded with pressure during piston movement in the second actuating direction is smaller than a sum of the at least two active faces that are loaded with pressure during piston movement in the first actuating direction.

3. The controllable shock absorber of claim 1 wherein the valve body is the only valve body that the pilot control valve comprises for setting the pressures in the pilot control chambers, wherein a position of the valve body is adjustable via the actuator.

4. The controllable shock absorber of claim 1 wherein the closing element is movable between a closed position in which the closing element closes an inlet opening of the first outflow path and an open position in which the closing element releases the inlet opening of the first outflow path.

5. The controllable shock absorber of claim 1 wherein when the actuator is inactive the closing element is movable into a closed position by way of pressure that prevails in the second outflow path.

6. The controllable shock absorber of claim 1 wherein the closing element is magnetically actuatable.

7. The controllable shock absorber of claim 6 wherein the closing element is adjacent to a magnetic element, wherein the closing element and the magnetic element are positioned in a magnetic flux, wherein the magnetic element is configured to move the valve body into the closed position.

8. The controllable shock absorber of claim 7 wherein the magnetic element is an armature.

9. The controllable shock absorber of claim 1 further comprising a restoring element for restoring the valve body and for restoring the closing element.

10. The controllable shock absorber of claim 1 further comprising the actuator for actuating the position of the valve body, wherein the actuator is configured to load the closing element into an open position.

11. The controllable shock absorber of claim 1 comprising an outflow valve disposed in the first outflow path or downstream of the first outflow path, wherein by way of the outflow valve a back pressure acting on the valve body can be built up on the outflow side of the valve body to force the valve body into a closed position.

12. The controllable shock absorber of claim 1 wherein a position of the closing element determines whether the first outflow path is closed or open, wherein activation of the actuator causes the closing element to open the first outflow path.

13. The controllable shock absorber of claim 1 wherein the closing element borders the first and second outflow paths.

14. The controllable shock absorber of claim 1 wherein the closing element is configured to close the first outflow path by making direct contact with a portion of the first outflow path.

15. The controllable shock absorber of claim 1 wherein the closing element is configured to close the first outflow path by directly obstructing the first outflow path.

16. A controllable shock absorber comprising:
a cylinder tube that contains hydraulic fluid in a sealed manner, the cylinder tube extending along a cylinder tube axis;
a piston that is movable axially within the cylinder tube along the cylinder tube axis, the piston dividing the cylinder tube into two working spaces, wherein the piston comprises a first fluid leadthrough and a second fluid leadthrough that connect the two working spaces;
a first valve assembly disposed on the first fluid leadthrough for damping movement of the piston in a first actuating direction;
a second valve assembly disposed on the second fluid leadthrough for damping movement of the piston in a second actuating direction, wherein each of the first and second valve assemblies comprises a pilot control chamber, wherein pressures in the pilot control chambers are settable by way of a pilot control valve that comprises a valve body that is movable between a closed position and an open position, wherein moving the valve body between the closed and open positions adjusts an outflow through which hydraulic fluid flows from the pilot control chambers to the two working spaces;
a first outflow path and a second outflow path adjoining the valve body on an outflow side, wherein the first outflow path is closed when an actuator for actuating a position of the valve body is inactive; and
a closing element that is separate from the valve body and is configured to close only the first outflow path by directly obstructing the first outflow path.

17. The controllable shock absorber of claim 16 wherein the closing element is configured to open and close the first outflow path on the outflow side of the valve body independent of any pressure acting on the valve body.

18. The controllable shock absorber of claim 16 comprising a magnetic element that is coupled to the valve body, with the closing element being disposed between the magnetic element and the valve body, wherein the closing element and the magnetic element are disposed in and movable by a magnetic flux of the actuator.

19. The controllable shock absorber of claim 16 wherein activation of the actuator causes the closing element to open the first outflow path independent of any pressure acting on the valve body.

20. The controllable shock absorber of claim 16 wherein the closing element is positioned such that the second outflow path remains unobstructed by the closing element upon activation of the actuator.

* * * * *